United States Patent
Jordan, Jr. et al.

(10) Patent No.: US 9,665,077 B2
(45) Date of Patent: May 30, 2017

(54) GAS TURBINE FIRING TEMPERATURE CONTROL SYSTEM AND METHOD

(71) Applicant: General Electric Company, Schenectady, NY (US)

(72) Inventors: Harold Lamar Jordan, Jr., Greenville, SC (US); Rex Allen Morgan, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 732 days.

(21) Appl. No.: 14/133,611

(22) Filed: Dec. 18, 2013

(65) Prior Publication Data
US 2015/0168927 A1 Jun. 18, 2015

(51) Int. Cl.
*G05D 3/12* (2006.01)
*G05B 15/02* (2006.01)
*F02C 9/28* (2006.01)

(52) U.S. Cl.
CPC ............. *G05B 15/02* (2013.01); *F02C 9/28* (2013.01); *F05D 2270/303* (2013.01); *F05D 2270/311* (2013.01)

(58) Field of Classification Search
None
See application file for complete search history.

(56) References Cited

U.S. PATENT DOCUMENTS

| | | | | |
|---|---|---|---|---|
| 3,912,912 A | * | 10/1975 | Pollock | C03B 5/24 700/37 |
| 4,292,946 A | * | 10/1981 | Masaki | F02D 41/144 123/438 |
| 4,331,116 A | * | 5/1982 | Simonds | F02D 41/02 123/337 |
| 4,344,399 A | * | 8/1982 | Matsumura | F02D 41/26 123/179.18 |
| 5,165,223 A | * | 11/1992 | Ingham | F02C 7/26 60/778 |
| 5,846,067 A | * | 12/1998 | Nishiyama | F23C 6/042 431/115 |
| 6,226,974 B1 | | 5/2001 | Andrew et al. | |
| 6,912,856 B2 | | 7/2005 | Morgan et al. | |
| 7,100,357 B2 | | 9/2006 | Morgan et al. | |
| 2001/0004830 A1 | * | 6/2001 | Wakana | F02C 6/14 60/39.182 |

(Continued)

OTHER PUBLICATIONS

European Search Report and Opinion issued in connection with corresponding EP Application No. 14198154.8 on May 19, 2015.

(Continued)

*Primary Examiner* — Adam Lee
(74) *Attorney, Agent, or Firm* — Fletcher Yoder, P.C.

(57) ABSTRACT

A non-transitory computer-readable medium storing computer executable code that includes instructions to receive a signal representative of a gas turbine firing temperature. The code further includes instructions to convert the signal to an actuator signal to actuate a fuel valve supplying fuel to the gas turbine by following a first reference function. The first reference function includes a first boundary function, a second boundary function, or a combination thereof. The first boundary function maps a first value to a first temperature and the second boundary function maps a second value to a second temperature.

17 Claims, 8 Drawing Sheets

(56) References Cited

U.S. PATENT DOCUMENTS

| | | | |
|---|---|---|---|
| 2002/0106001 A1 | 8/2002 | Tomlison et al. | |
| 2004/0055273 A1 | 3/2004 | Hirayama et al. | |
| 2004/0255595 A1 | 12/2004 | Morgan et al. | |
| 2007/0169757 A1* | 7/2007 | Nakagawa | F02D 19/0631 123/491 |
| 2008/0276615 A1* | 11/2008 | Bennett | F01L 1/46 60/614 |
| 2008/0298957 A1* | 12/2008 | Chillar | F02C 7/04 415/177 |
| 2009/0173078 A1 | 7/2009 | Thatcher et al. | |
| 2010/0327587 A1* | 12/2010 | Luo | F02G 1/047 290/51 |
| 2013/0086883 A1* | 4/2013 | Sander | F02C 3/34 60/39.52 |

OTHER PUBLICATIONS

Chinese Office Action for CN Application No. 201410785793.2 Mailed Mar. 24, 2017; 8 Pages.

\* cited by examiner

GAS TURBINE FIRING TEMPERATURE CONTROL SYSTEM AND METHOD

BACKGROUND

The subject matter disclosed herein relates generally to turbomachinery systems, such as gas turbines. Specifically, the subject matter relates to methods and systems for controlling a gas turbine system.

In a turbine system, the firing temperature is the temperature produced within the turbine's combustion system, e.g. flame temperature. Firing control algorithms may determine how to derive a desired firing temperature and then provide the actual firing temperature of the turbine by controlling, for example, an amount of fuel fed to the combustion system. The firing control algorithms may determine the desired firing temperature based on turbine parameters such as exhaust temperature, compressor pressure ratio, and compressor inlet temperature.

Current firing control algorithms incorporate static assumptions about the turbine's operating environment and component performance over time. They also consider the turbine's various operating states and constraints interdependent with each other. Because of such assumptions and state interdependency, the accuracy of the firing temperature control and the level of performance associated with these firing control algorithms may decreases as the turbine ages, and the algorithms may require seasonal tuning.

Certain firing control algorithms, such as model based control (MBC) algorithms, may incorporate variations in the turbine's operating environment and/or component performance over time. MBC firing control algorithms may treat the turbine's various operating states and constraints as independent states, leading to more accurate firing temperature control and increased levels of performance. However, implementing MBC firing control algorithms may require a complete overhaul of the turbine controller's software and/or hardware by a qualified technician, which can be slow and expensive.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system may include a controller configured to control a turbomachinery. The controller may include data relating to a first boundary function mapping a first value related to the turbomachinery to a first temperature and a second boundary function mapping a second value related to the turbomachinery to a second temperature. Further, the controller may receive a sensor signal representative of a fired temperature of the turbomachinery. The controller may subsequently transform the sensor signal to an actuator signal to actuate a fuel valve supplying fuel to the turbomachinery by following a first reference function that includes at least the first boundary function, the second boundary function, or a combination of the two.

In a second embodiment, a non-transitory computer-readable medium may store computer executable code that includes instructions to receive a signal representative of a gas turbine firing temperature. The computer executable code may also include instructions to convert the signal to an actuator signal to actuate a fuel valve supplying fuel to the gas turbine by following a first reference function. The first reference function may include a first boundary function, a second boundary function, or a combination thereof. The first boundary function may map a first value related to the gas turbine system to a first temperature and the second boundary function may map a second value related to the gas turbine system to a second temperature.

In a third embodiment, a method includes deriving a first boundary function mapping a first value related to a turbomachinery to a first temperature and deriving a second boundary function mapping a second value related to the turbomachinery to a second temperature. The method may also include collecting a sensor signal representative of a fired temperature of the turbomachinery and converting the sensor signal to a first actuator signal to actuate a fuel valve of a gas turbine system by following a first reference function. The first reference function may include the first boundary function, the second boundary function, or a combination thereof.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
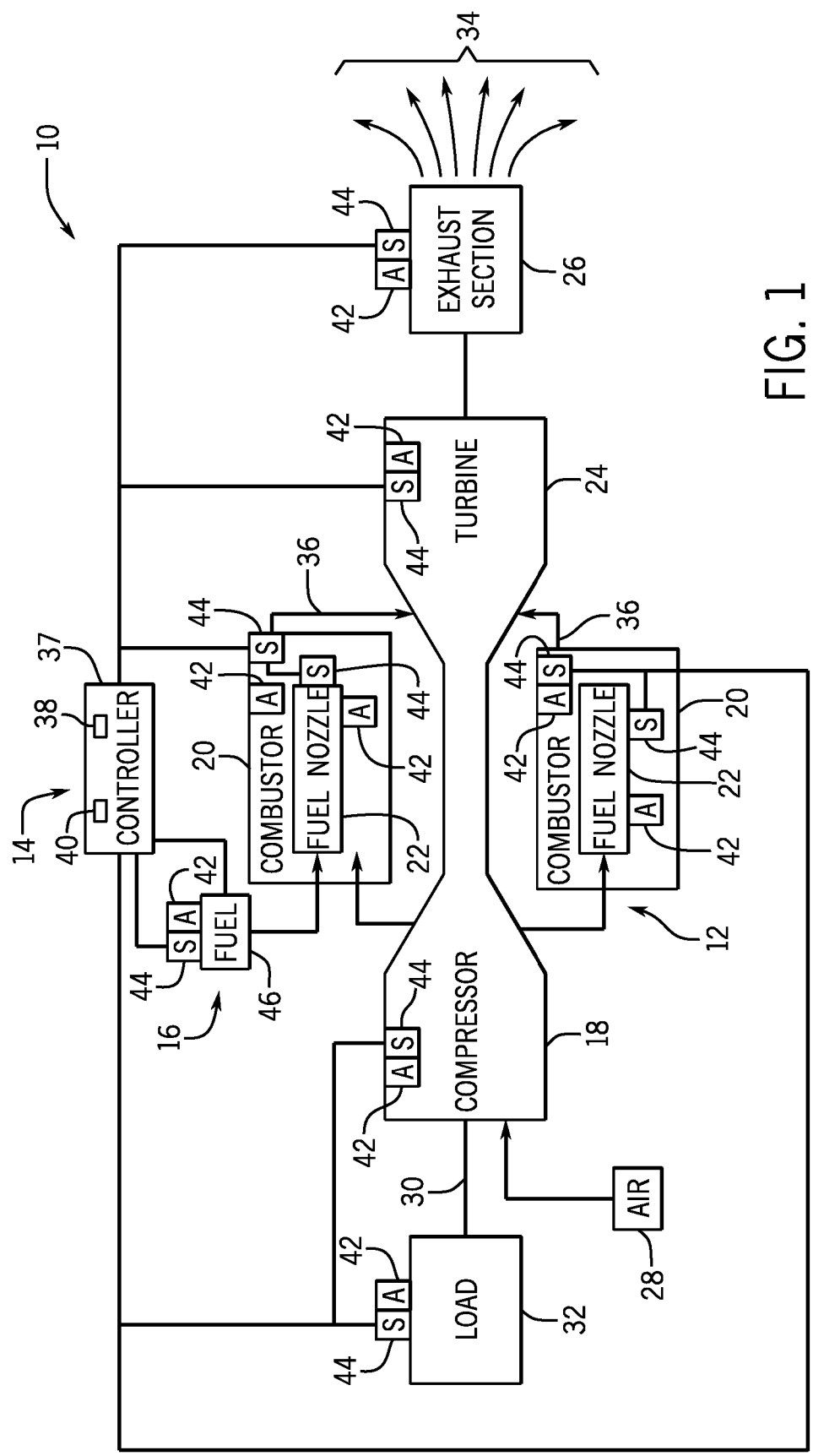
FIG. 1 a block diagram of an embodiment of a gas turbine system, in accordance with an embodiment of the present approach.

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. The term "firing temperature" refers to the overall temperature of the combustion gases generated in the combustion system of a turbomachinery system or to the temperature of the combustion gases at specific locations in the turbomachinery system, such as combustor exit, turbine inlet or stage 1 nozzle trailing edge. A "firing control algorithm" refers to an algorithm that determines a desired firing temperature and then manipulates one or more actuators, such as fuel valves delivering fuel to fuel nozzles, to produce an actual firing temperature in a combustion system. The term "boundary function" refers to one or more reference functions mapping a measured turbine parameter to a temperature, such a temperature related to turbomachinery.

Present embodiments relate to systems and methods for controlling the firing temperature of a turbine combustion system based on one or more parameters associated with the turbomachinery system. Specifically, the present embodiments relate to a control process to determine the firing temperature of the turbine combustion system based on the one or more parameters and then determine control actions that may be applied to a fuel supply of the turbomachinery system to achieve the desired firing temperature. The control processes described herein may be provided as a software upgrade, such as by adding or updating a few lines of computer code (e.g., less than 500 lines of code) to an existing control system. The update control process may improve a full load firing control response and address performance degradation of the turbine system and components thereof.

Techniques described herein provide for a full (or partial) load firing control strategy where a singular exhaust temperature reference scheduled as a function of compressor pressure ratio may be used to implicitly manage a resultant firing temperature target that may be variable across a minimum to maximum ambient temperature range. These control strategies provide implicit control of firing temperature based on assumed component performance levels that reflect the average unit and the associated relationship between firing temperatures and exhaust temperatures. While other control strategies, such as model based control (MBC) may provide more direct control of firing levels by use of gas turbine cycle performance models within the control algorithm, there are a large number of gas turbine systems deployed in the field that currently use simpler control strategies. Such deployed systems might benefit from the upgrades to control algorithms described herein.

The desired firing temperature may be variable with ambient or compressor inlet condition, usually resulting in a suppression of the target temperature at cold ambient conditions to maintain combustor operability and emissions within desired limits. As noted above, tailoring of the firing profile with ambient temperature may be built into the singular exhaust temperature reference scheduled as a function of compressor pressure ratio. The singular exhaust temperature reference may be tuned to meet a target firing level with reasonable accuracy during a new unit installation performance characterization. However, as the gas turbine continues to operate and component performance levels degrade from the level demonstrated during performance characterization, the resultant firing temperature level may begin to trend off target to design intent. The degree to which the exhaust temperature control algorithm trends off target is a function of multiple effects but is most pronounced where the intended shaping of the firing profile with ambient condition is being suppressed relative to a maximum level. Where there is an intended suppression with ambient condition built in to the exhaust temperature reference, then the sensitivity of firing control to degradation effects is most pronounced. This trending of firing temperature off target relative to design intent can result in combustor operability and emissions issues, possibly leading to combustor operability re-tuning and periods of unavailability. The techniques described herein offer an approach to improving this tendency of firing temperature drift from design intent as the component performance degrades.

The control processes described herein may treat the turbine's operating states and constraints as independent states, increasing the accuracy of the firing temperature control and the overall performance of the turbine. The control process may also include a tuning element and adjustment functions to account for variation among individual turbomachinery systems as well as variation in the turbine's operating environment. Further, the control process may include some or all elements of existing control processes, and may be provided as a smaller and more efficient upgrade to the turbomachinery software and/or hardware.

With the forgoing in mind, it may be useful to describe an embodiment of a turbomachinery system, such as an example gas turbine system 10 illustrated in FIG. 1. In certain embodiments, the gas turbine system 10 may include a gas turbine 12, a control system 14, and a fuel supply system 16. These systems may operate in conjunction to determine the firing temperature in the gas turbine 12 and to adjust the fuel supply system 16. As illustrated, the gas turbine 12 may include a compressor 18, combustion system 20, fuel nozzle 22, turbine 24, and exhaust section 26. During operation, the gas turbine 12 may intake gas (e.g., air) 28 into the compressor 18, which then compresses the air 28 and moves it to the combustion system 20 (e.g., a plurality of combustors). In the combustion system 20, the fuel nozzle 22 (or a plurality of fuel nozzles 22) injects fuel that mixes with the compressed air creating an air-fuel mixture. The air-fuel mixture may combust in the combustion system 20 to generate hot combustion gases, which flow downstream into the turbine 24 to drive one or more turbine 24 stages. For example, the combustion gases move through the turbine 24 to drive one or more stages of turbine 24 blades, which in turn drive rotation of shaft 30. The shaft 30 connects to a load 32, such as a generator that uses the torque of the shaft 30 to produce electricity. After passing through the turbine 24, the hot combustion gases may vent as exhaust gases 34 into the environment through the exhaust section 26.

Figure 2:
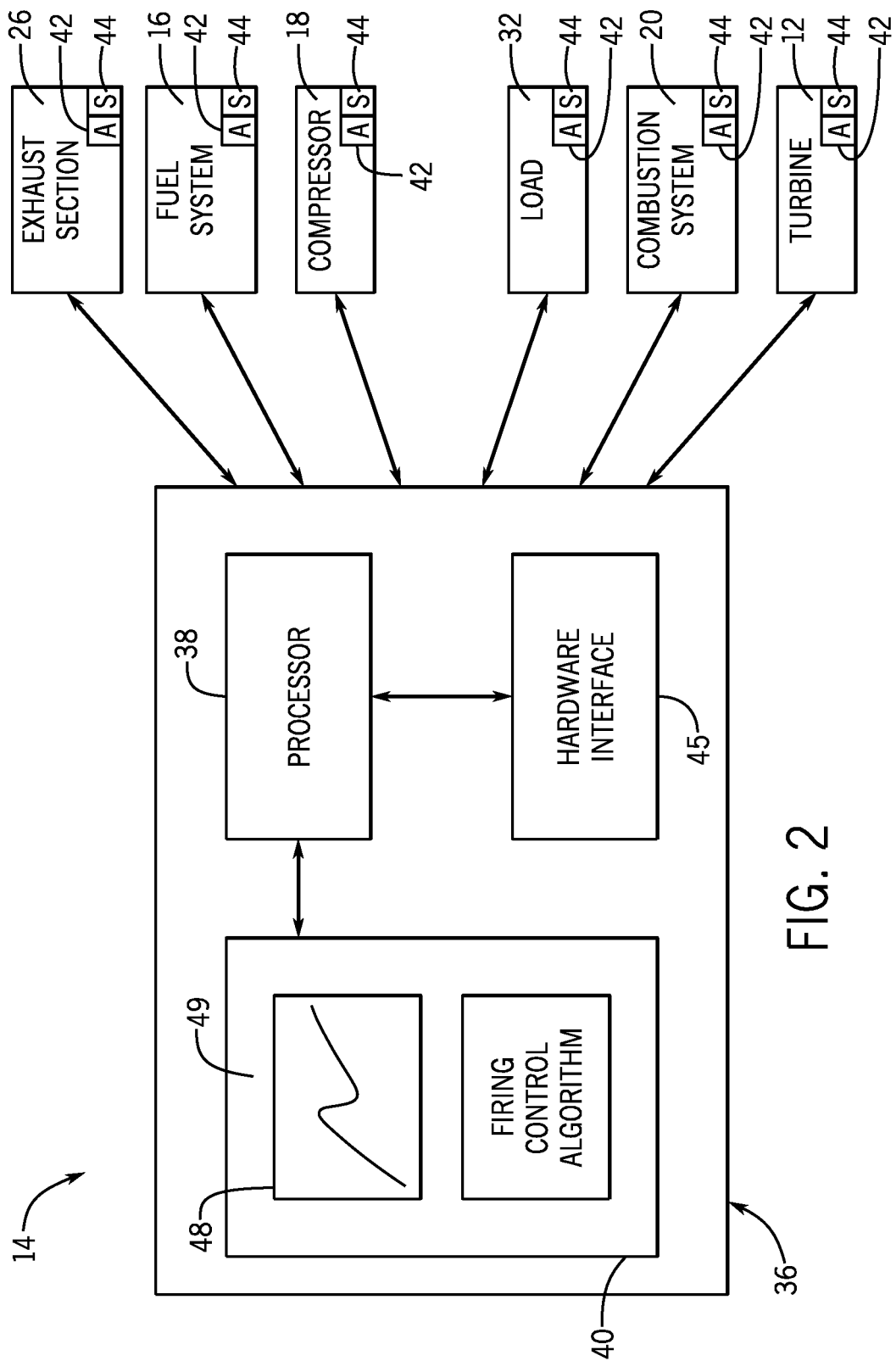
FIG. 2 is a block diagram of a control system of a gas turbine system, in accordance with an embodiment of the present approach.

In certain embodiments, the control system 14 may include a controller 36, a processor 38, a memory 40, and a hardware interface 45 suitable for interfacing with the actuators 42 and the sensors 44, as shown in FIG. 2. Accordingly, the control system 14 may be communicatively coupled to sensors 44 such that the controller 36 may receive data from the sensors 44. In response to the sensor 44 data, the processor 38 may then execute instructions stored on the memory 40 to control components of the gas turbine system 10 (e.g., fuel system 16) via the actuators 42. The actuators 42 may include valves, pumps, positioners, inlet guide vanes, switches, and so on, useful in performing control actions. The sensors 44 may provide various data to the controller 36 including, for example, the amount of fuel 46 provided to the combustion system 22, the temperature of the fuel 46, the pressure ratio of the compressor 18, and the inlet temperature of the compressor 18.

Figure 3:
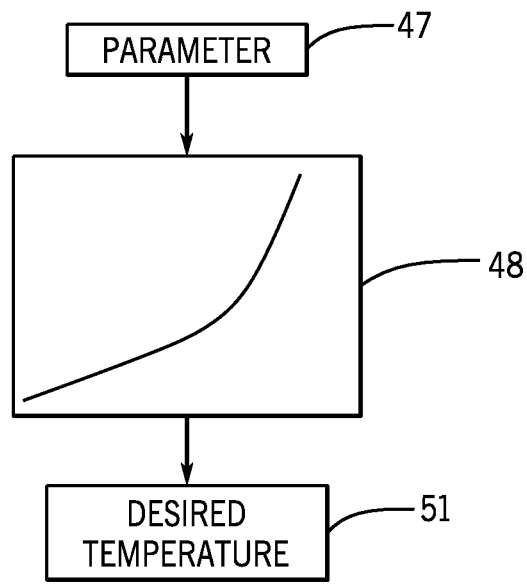
FIG. 3 is a block diagram of a control flow of a gas turbine system, in accordance with an embodiment of the present approach.

The firing temperature of the combustion system 20, as described above, may be determined in part by the ratio of fuel to air in the air-fuel mixture. As such a desired firing temperature graph 48, as illustrated in FIG. 3, may reflect the desired firing temperature 51 of the combustion gases as a function of a turbine parameter 47. Additionally, a plurality of other graphs 49 are provided as described in more detail below with respect to FIGS. 4-8, also useful in deriving control actions. In the embodiments described below, the graph 48 may be implicit within the definition a graph 49, and the graphs 49 may be stored in the memory 40 and executed by the processor 38. Further, the memory 40 may also contain instructions executable by the processor 38 that implement a firing control process, as described above. The processor 38 may execute the instructions of the firing control process to determine the actual firing temperature of the combustion system 20 based on a turbine parameter measured by the sensors 44. The processor 38 may then execute instructions in the firing control process to compare the actual firing temperature to the desired firing temperature and determine the amount of fuel 46 to supply to move the actual firing temperature to the desired firing temperature.

Figure 4:
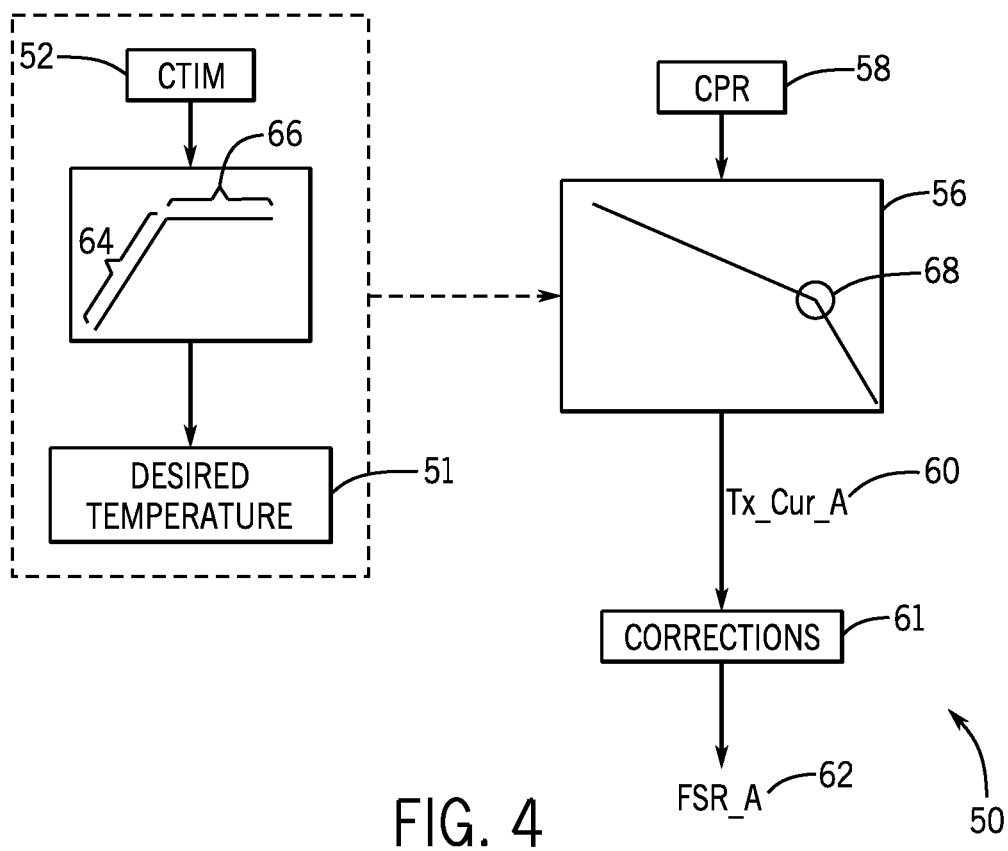
FIG. 4 is a block diagram of a prior art firing control algorithm for a gas turbine system, in accordance with an embodiment of the present approach.

With the foregoing in mind, FIG. 4 is a block diagram that illustrates existing desired firing control process 50. As mentioned above, the firing temperature graph 48 may be used to derive a desired firing temperature and associated control actions and may be implicit in the definition of graphs used in a firing control process, as described in more detail below. In the depicted embodiment, for example, a compressor inlet temperature (CTIM) 52, as measured, for example, by sensors 44, may be mapped to a desired firing temperature 51 via the graph 48. As stated previously, this graph is notional or implicit in the definition of the actual Tx vs CPR control curve. It is the implicit or intended outcome that is used to produce the operative Tx vs. CPR curve but it is this translation from a boundary space as a function of CTIM to a boundary space that is a function of CPR that introduces the primary problem with respect to degradation. In this notional curve, the element shown as 64 is a constraint at or above ISO conditions that relates to hot gas path life and element 66 is at or below ISO constraint that relates to combustion system emissions and operability. A compressor pressure ratio (CPR) reference function or graph 56, which may incorporate the desired firing temperature graph 48, maps a measured CPR 58 to an actual firing temperature defined as an actual or current temperature Tx_Cur_A 60. More specifically, the graph 56 may be used as a proxy for the graph 48 to derive the desired firing temperature 51 based on the exhaust temperature, as indicated by the dashed line in FIG. 4. Tx_Cur_A 60 may then be adjusted to account for the load 32, ambient humidity and temperature, and other factors via corrections 61 that affect the gas turbine system 10. The adjusted Tx_Cur_A 60 may then used to yield a fuel stroke reference FSR_A 62. FSR_A 62 represents a fuel valve control action derived to achieve a target exhaust temperature representative of the desired firing temperature; based on fuel flow. The controller 36 may thus adjust the amount of fuel 46 provided to the combustion system 20.

The firing control process 50 may include certain assumptions regarding the operating conditions of the gas turbine 12. For example, levels of the compressor inlet pressure, exhaust back pressure, and specific humidity may be defined in the firing control algorithm 50, for example, and incorporated as assumptions in a shape or curve provided by the reference function 56. As such, deviations from the assumptions may be incorporated as corrections 61 into Tx_Cur_A 60, as described above. The firing control process 50 may also include assumptions about desired performance levels of individual components of the gas turbine 12.

The firing control process 50 may only contain one boundary function. Specifically, there are many operating states and sets of operating constraints in which the gas turbine system 10 may function. For example, the baseload operating state refers to the state at which the gas turbine system operates at its highest efficiency. Additionally, within the baseload operating state, there may be different constraints placed on the firing temperature based on whether the turbomachinery system 10 is operating at, above, or below international organization for standardization (ISO) conditions. The partload operating state refers to any state when the gas turbine system 10 does not operate at its highest efficiency, and may be further divided into other operating states. For example, the loading portion operating state may refer to a specific partload operating state in which the gas turbine system 10 is continually adjusted to move towards the baseload operating state.

The relationship between a measured turbine parameter and a firing temperature may change depending on the operating state and/or set of operating constraints of the gas turbine system 10. Because the firing control process 50 may contain only one boundary function, all of the operating states and/or sets of operating constraints for the gas turbine system 10 may be expressed in a single reference function used to determine the actual firing temperature. For example, the desired firing temperature graph 48 illustrated in FIG. 4 may correspond to a baseload operating state that may be divided into a section 64 that corresponds to the turbomachinery below ISO conditions and a section 66 that corresponds to the turbomachinery at or above ISO conditions. In other embodiments wherein the desired firing temperature graph 48 corresponds to a partload operating state, the sections 64 and 66 may correspond to various operating states and/or constraints and may establish the "best path" to base load.

As noted above, the CPR reference function 56 (e.g., a proxy for the graph 48 based on measuring the turbine exhaust temperature) is a singular boundary function 56 that may incorporate all types of operating states and/or sets of operating constraints. For example, the reference function 56 as depicted in FIG. 4 may incorporate both sections 64 and 66 into its definition, wherein the point or turn 68 represents the change from one operating state and/or set of operating constraints to another. In short, during execution, the firing control process 50 considers the various operating states and/or sets of operating constraints of the gas turbine system 10 to be interdependent.

Figure 5:
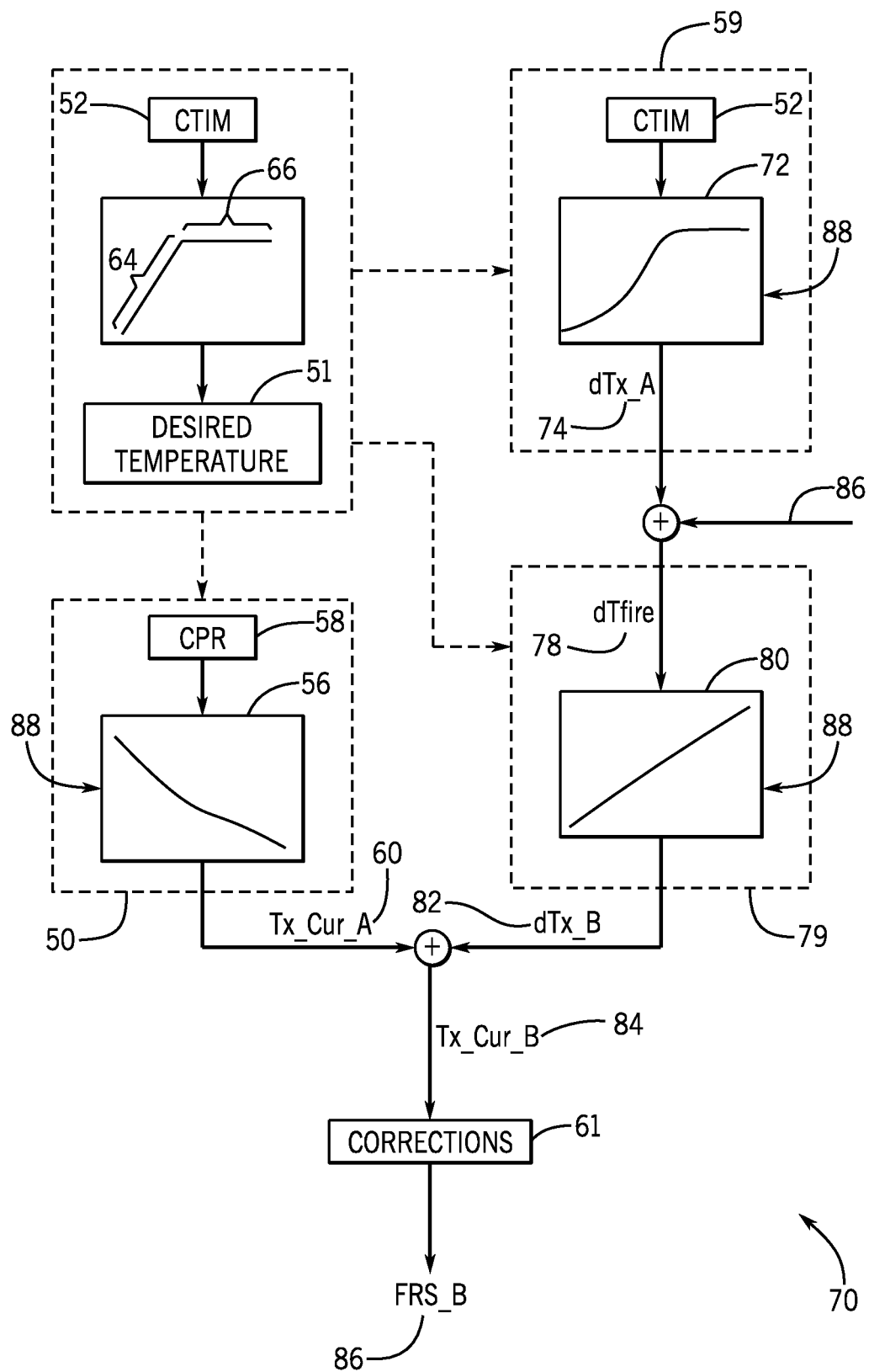
FIG. 5 is a block diagram of an enhanced firing control algorithm for a gas turbine system, in accordance with an embodiment of the present approach.

In one embodiment, an enhanced firing control process 70, as illustrated in FIG. 5, is provided that incorporates the firing control process 50 as a first control process 50 and then subsequently adds a second and third control process, thus using multiple functions or graphs. Advantageously, a control process already implemented by the control system 14 may be reused, and modifications to the control system programming may be smaller. For example, the existing firing control process 50 may still function as described above and may not require any substantial modification, or any modifications. A second control process 59 maps a measured value of the CTIM 52 to a delta firing temperature via CTIM reference function 72, and the output is defined as dTx_A 74. That is, the CTIM reference function 72 may include an abscissa having a measured temperature of the compressor inlet valve and an ordinate having a delta firing temperature, and a shape similar to or the same as illustrated in the figure. In this process 59, the delta firing temperature represents the difference between the actual firing temperature as determined by the measured CTIM value and the desired firing temperature. Similarly to the reference function 56, the CTIM reference function 72 may incorporate the desired firing temperature graph 48 within its definition.

A tuning element 76 may be applied to dTx_A 74, and the output is defined as dTfire 78. The tuning element 76 is a constant that may be used during new unit installation and commissioning to shift the firing level up or down. For final settings, the tuning element 76 emerges as a calibration constant that may be employed to tune an individual gas turbine system 10 to the original intended design; it absorbs the unit to unit variation from the mean machine used in theoretical designs.

In a third control process 79, as illustrated in FIG. 5, dTFire 78 is mapped to a delta exhaust temperature according to a transfer function 80 to produce the output dTx_B 82. The transfer function 80 may include an abscissa having dTfire 78, which, as mentioned above, may represent the result of applying the tuning element 76 to dTx_A 74. The transfer function may also include an ordinate having a delta exhaust temperature, wherein the delta exhaust temperature represents the relationship between a specified change in firing temperature and corresponding change in exhaust temperature. Similarly to the reference functions 56 and 72, the transfer function 80 may incorporate the desired firing temperature graph 48 within its definition. dTx_B 82 and Tx_Cur_A 60 are then combined to produce the output Tx_Cur_B 84. Tx_Cur_B 84 may be adjusted using corrections 61 described above and may then be used to generate a fuel stroke reference FSR_B 86. Based on FSR_B 86, the controller 36 determines the amount of fuel 46 that may be supplied to the combustion system 20 to achieve the target exhaust temperature.

As the enhanced firing control process 70 may incorporate the control process 50 in its entirety, it may also incorporate other aspects related to the existing control process 50. However, in certain embodiments departing from the existing control process 50, the enhanced firing control algorithm 70 may include more than one boundary function.

In the enhanced firing control process 70, the various operating states and/or sets of operating constraints may be divided into at least two boundary functions, or more. As noted above, the desired firing temperature graph 48 in FIG. 3 may be divided into two boundary functions, one describing to a section 64 that corresponds to the turbomachinery in a baseload operating state and below ISO conditions and another describing a section 66 that corresponds to the turbomachinery in a baseload operating state and at or above ISO conditions. For example, the reference functions 56, 72, and 80 illustrated in FIG. 4 may correspond to a boundary function that describes section 64, which corresponds to the turbomachinery in a baseload operating state and below ISO conditions. A second boundary function may describe section 66. The reference functions 56, 72, and 80 corresponding to the second boundary function describing section 66 may differ from the reference functions used that correspond to section 64. In other embodiments, one version of a reference function may be associated with multiple boundary functions.

Because the reference functions may change as the current operating state and/or set of operating constraints of the gas turbine system 10 changes, the controller 36 may be configured to determine the appropriate boundary function and select the corresponding set of reference functions. To determine the desired boundary function, the enhanced firing control process 70 may include a boundary function selection input 88. The controller 36 may include a user input device, such as a keyboard or mouse, through which an operator may manually select the current operating state and/or set of operating constraints and subsequently the correct boundary functions. Alternatively, the controller 36 may communicate with the sensors 44 to automatically determine the operating state and/or set of operating constraints and adjust the boundary functions accordingly.

Figure 6:
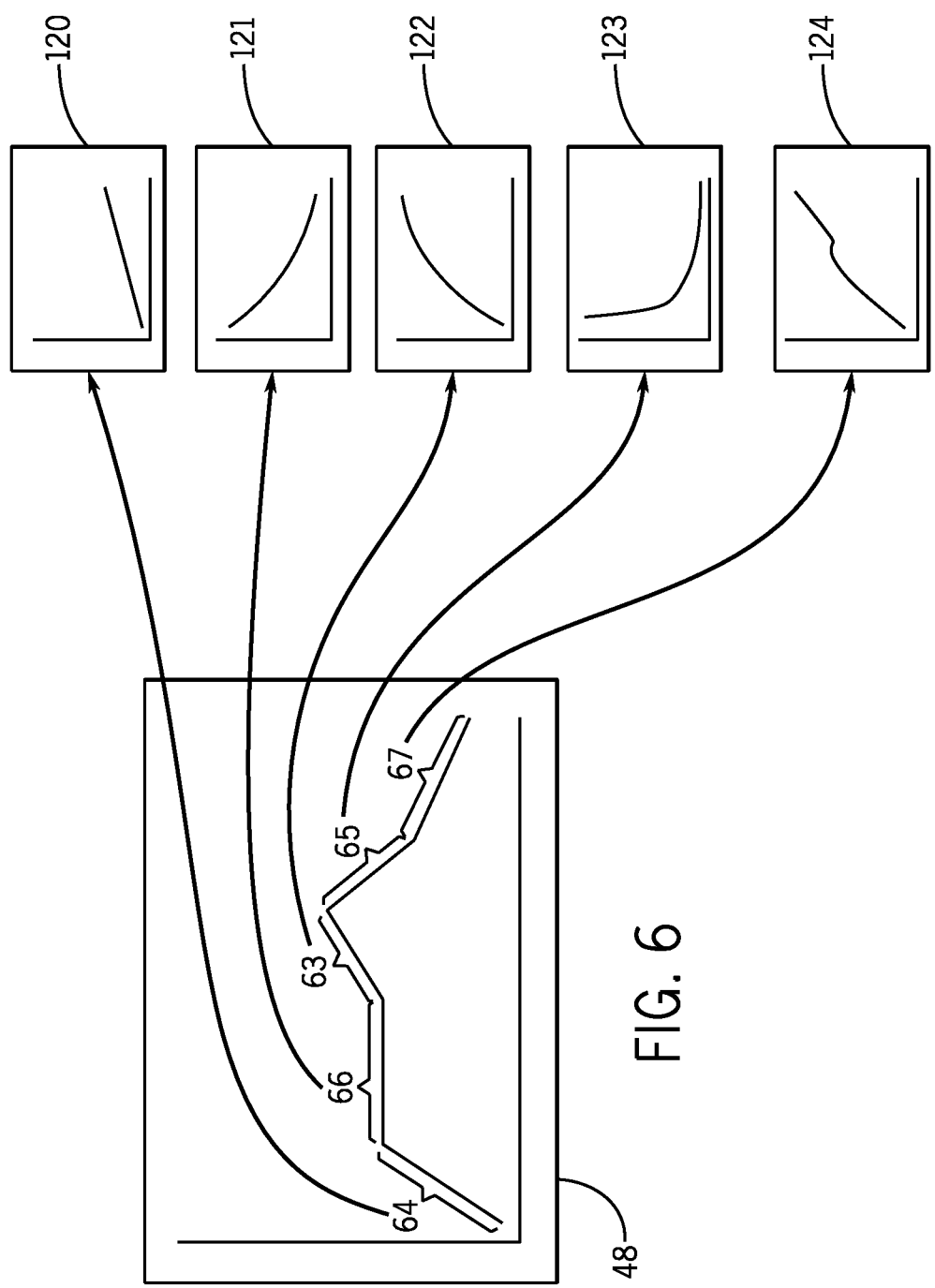
FIG. 6 is a block diagram illustrating the reference functions associated with various operating states, in accordance with an embodiment of the present approach.

For the enhanced firing control process 70, the various operating states and/or sets of operating constraints may be divided into five boundary functions. For instance, FIG. 6 illustrates the desired firing temperature graph 48 divided into sections 64, 66, 63, 65, and 67, each of which is associated with a particular operating state and/or set of operating constraints. Each of the sections may be described by a boundary function, which may correspond with a unique version of the reference function 56, as illustrated and as described above. In one embodiment, incorporating more than five boundary functions into the enhanced firing control process 70 may introduce an amount of complexity similar to that of more sophisticated firing control algorithms. The increased complexity may lead to a significant overhaul of the instructions stored on the memory 40 and may also do a poor job of leveraging the existing firing control process 50.

Figure 7:
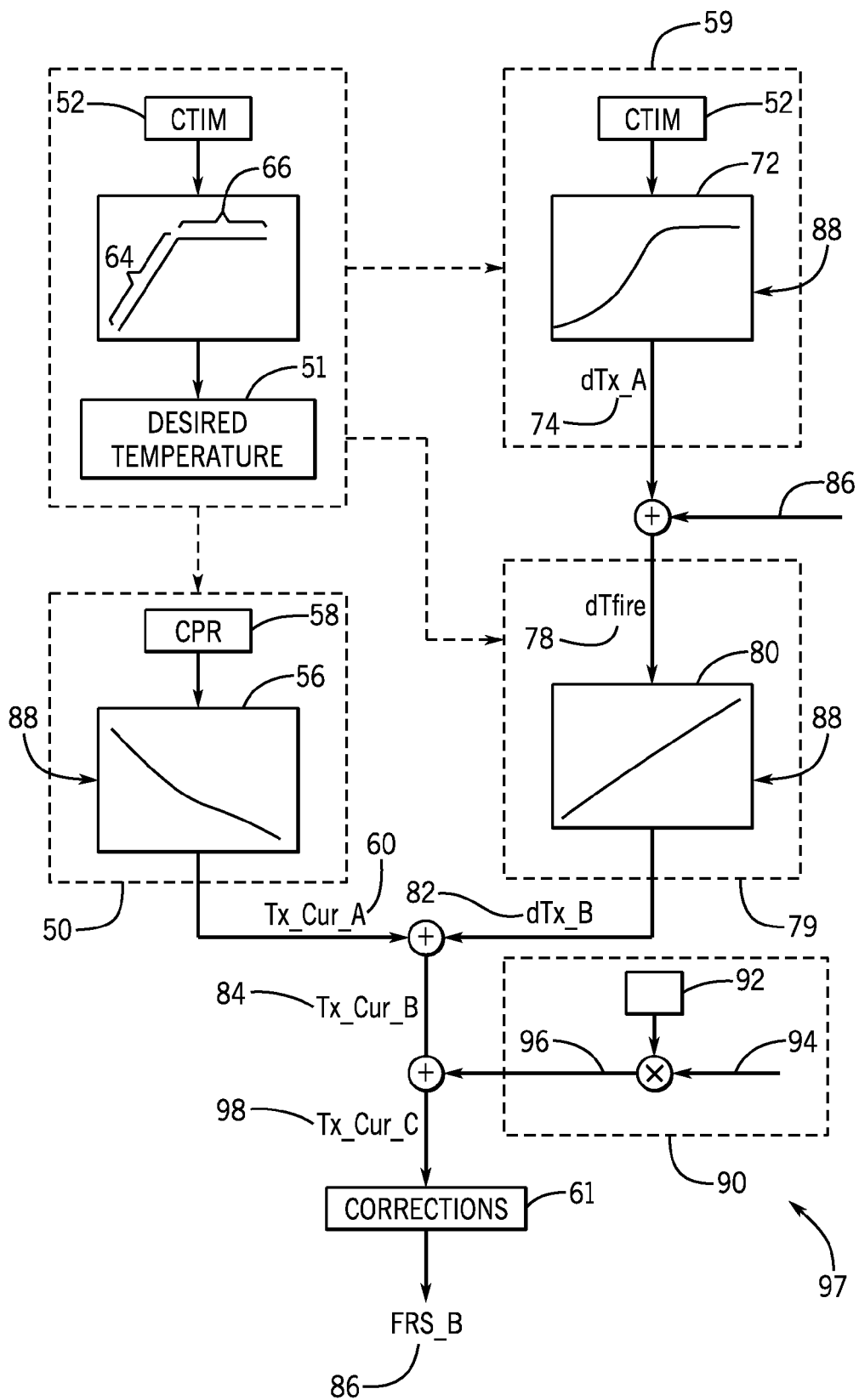
FIG. 7 is a block diagram of the enhanced firing control algorithm of FIG. 5 with a humidity correction, in accordance with an embodiment of the present approach.

The enhanced firing control process 70 may include assumptions about the turbine's operating environment and component performance level, much like the existing firing control algorithm 50. As such, it may also allow for adjustments to deviations from the assumptions. For example, if a sensor 44 produces an inlet humidity measurement, then a humidity correction 90 may be incorporated into the enhanced firing control process 70, as illustrated in FIG. 7.

An actual inlet humidity 92, as measured by one or more sensors 44, may have an adjustment factor 94 applied to it, and an output may represent a humidity adjustment 96. For example, a process 97 illustrated in FIG. 7 has an assumed humidity level of zero, and so the adjustment factor 94 may be a constant gain factor. The humidity adjustment 96 may be combined with Tx_Cur_B 84 to produce Tx_Cur_C 98, which may then be adjusted by other corrections 61 before being used to generate FSR_B 86 as described above.

Further, even if a humidity measurement is unavailable, it may be advantageous to set the assumed humidity profile of the enhanced firing control process 97 to the median humidity profile. Such an adjustment may reduce the error to the actual humidity, and may result in an outcome that is no worse than the uncompensated scenario and possibly better. As will be appreciated, the types of corrections for the enhanced firing control process 70 are not limited to the humidity correction 90 as shown in process 97, but may focus on other aspects of a turbine's operating environment or component performance (e.g., compressor inlet pressure loss, exhaust back pressure).

As the enhanced firing control process 97 also incorporates the existing firing control process 50, it may be easy to configure the controller 36 to use the enhanced firing control processes 70 and/or 97. The enhanced firing control processes 70 and/or 97 may be provided as an update and, rather than overwriting the instructions for the existing firing control algorithm 50, may only add additional instructions.

Figure 8:
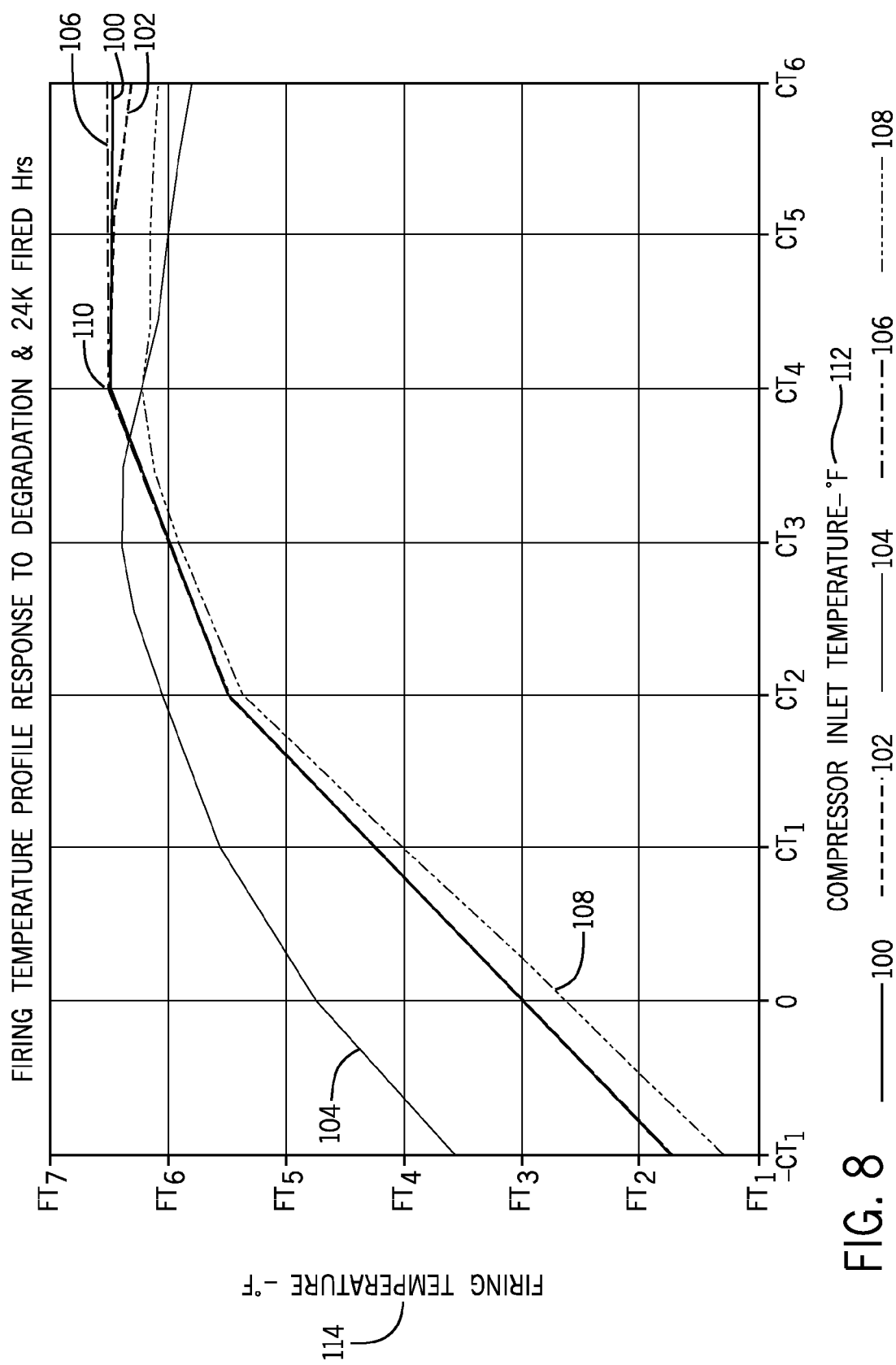
FIG. 8 is a graph comparing embodiments of firing temperature profiles of the existing and enhanced firing control algorithms and the desired firing temperature for a specific set of operating characteristics.

FIG. 8 is a graph illustrating embodiments of specific component performance degradation levels for both the existing and the enhanced firing control algorithms at 0K and 24K fired hours using a particular set of operating characteristics defined as "7FA.03" corresponding, for example, to a 7FA heavy duty gas turbine available from General Electric Company, of Schenectady, N.Y. The graph illustrates the relative accuracy of each of the firing control processes over time, and demonstrates the effect of performance degradation for various components, such as compressor efficiency and turbine efficiency. FIG. 8 may be useful to compare performance of various processes, such as the processes described herein. The curve indicated by reference numeral 100 may correspond to the design intent of the gas turbine. The curves indicated by reference numerals 102 and 104 may correspond to the firing temperature profile associated with the existing process 50 after 0K hours and after 24K fired hours, respectively. Similarly, the reference numerals 106 and 108 may correspond to the firing temperature profile associated with the enhanced processes 70 and/or 97 after 0K hours and after 24K. The hot day maximum level of the gas turbine is depicted by the reference numeral 110. FIG. 8 includes an abscissa 112 having a measured compressor inlet temperature and an ordinate 114 having a derived firing temperature.

As shown, the existing firing control process 50 may result in an over-fire to the desired firing temperature when the desired firing temperature is below the hot day maximum level. Once the hot day maximum level has been reached, the existing firing control algorithm tends to under-fire, which may occur when using exhaust temperature control strategies due to turbine efficiency loss.

The enhanced firing control processes 70 and/or 97 minimize or eliminate the cold day over-fire exhibited by the existing firing control strategy 50, and exhibit a slight under-fire at or above ISO conditions, much less than the existing firing control algorithm. ISO conditions or ratings may be used to specify an expected turbine system 10 performance (e.g., power produced, fire temperature achieved) based on ambient conditions of a given geographic locality (e.g., latitude and longitude) of the turbine system 10, such as altitude, ambient temperature, humidity, and other atmospheric conditions. The degree of under-fire increases with increasing levels of component performance degradation, as shown. Further, the "tilted profile" shaping as a function of compressor inlet temperature is largely maintained, unlike the more degraded characteristic of the existing firing control process 50. Indeed, FIG. 8 shows that performances for the processes 70 and/or 97 improve over performances for the process 50

Figure 9:
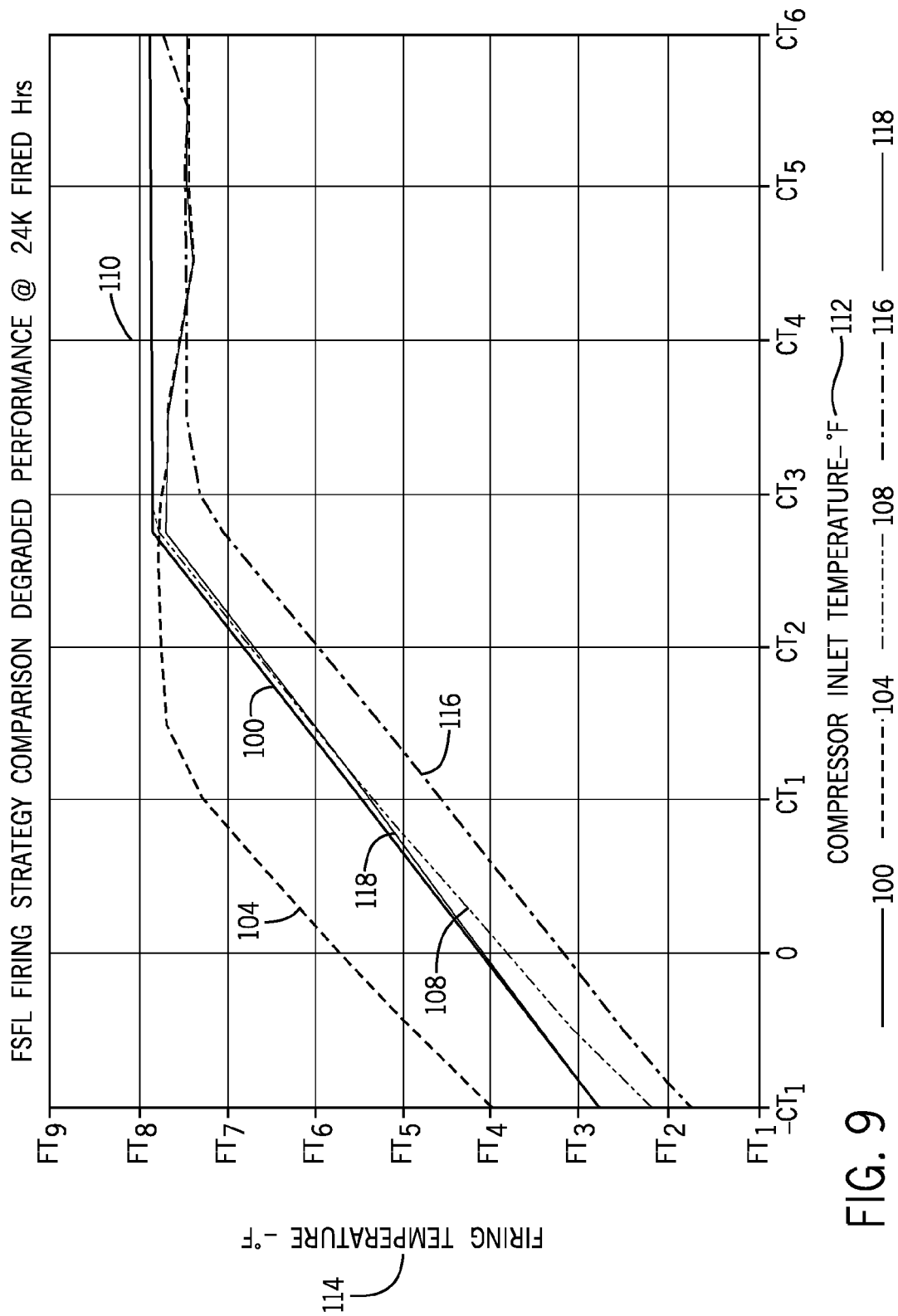
FIG. 9 is a graph comparing embodiments of firing temperature profiles of a variety of firing control algorithms and the desired firing temperature after 24K hours of operation.

FIG. 9 is a graph illustrating embodiments of specific component performance degradation levels for the existing and enhanced firing control processes as well as more sophisticated firing control algorithms CPC and MBC at 24K fired hours, for comparison purposes. The graph illustrates the relative accuracy of each of the firing control processes after a certain amount of time, and demonstrates the effect of performance degradation for various components, such as compressor efficiency and turbine efficiency. FIG. 9 includes an abscissa 112 having a compressor inlet temperature, an ordinate 114 having a derived firing temperature, and a reference numeral 110 indicating the hot day maximum level of the gas turbine. FIG. 9 also includes the firing temperature profiles associated with the existing process 50 after 24K fired hours and the enhanced processes 70 and/or 97 after 24K fired hours, numbered 104 and 108 respectively. The graph includes a firing temperature profile associated with a CPC firing control process, indicated by reference numeral 116, and a firing temperature profile associated with an MBC firing control process, indicated by reference numeral 118. While FIG. 8 compares the existing process 50 and the enhanced processes 70 and/or 97 to themselves and each other over an extended period of time, FIG. 9 compares the existing process 50 and the enhanced processes 70 and/or 97 to other firing control processes after an extended period of time.

As mentioned above, the existing firing control algorithm exhibits an over-fire at below ISO conditions and a slight under-fire at or above ISO conditions, which may lead to seasonal retunes. The enhanced firing control processes 70 and/or 97 exhibits characteristics similar to that of the CPC and MBC firing control algorithms. However, the enhanced firing control algorithm exhibits a hot day sensitivity to humidity variation much like the existing firing control algorithm, which may warrant a humidity correction as described above.

Technical effects of the disclosed embodiments include controlling the firing temperature of a combustion system of a gas turbine system. Certain embodiments may improve the accuracy of the firing temperature control and improve the performance level of the gas turbine system. For example, an enhanced firing control process organizes the various operating states into multiple boundary functions that may be used to determine the actions need to match an actual firing temperature to a desired firing temperature, which may lead to more accurate evaluations. The enhanced firing control process may be added to an existing firing control process, for example, by adding lines of computer executable code, which may minimize or eliminate the need for a significant overhaul of the gas turbine system's software and may require only a minimal amount of computer skills to implement. Further, the enhanced firing control process performs at levels not too dissimilar from more sophisticated firing control processes. By separating boundary functions, upgrades to firing control processes may not result in major changes to the gas turbine system's operation. The enhanced firing control process may also be implemented in older gas turbine systems not likely to be upgraded to more sophisticated firing control algorithms, for example, because of hardware constraints.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A system comprising:
  a controller configured to control a turbomachinery, wherein the controller is further configured to:

execute a first boundary function mapping a first value to a first temperature, wherein the first value is a compressor pressure ratio (CPR) value and the first temperature is an actual firing temperature;

execute a second boundary function mapping a second value to a second temperature wherein the second value is a compressor inlet temperature (CTIM) value and the second temperature is a delta firing temperature representative of the difference between the actual firing temperature and a derived firing temperature;

execute a first control process configured to receive a sensor signal representative of a fired temperature of the turbomachinery and to transform the sensor signal to an actuator signal to actuate a fuel valve supplying fuel to the turbomachinery by following a reference function that includes a combination of the first boundary function and the second boundary function.

2. The system of claim 1, wherein the sensor signal comprises an exhaust temperature signal.

3. The system of claim 1, wherein the controller is configured to execute a second control process having an adjustment function configured to derive an adjustment value based on ambient conditions, wherein the adjustment value is used to adjust an output of the first control process.

4. The system of claim 3, wherein the adjustment function comprises a humidity adjustment function.

5. The system of claim 1, wherein the first boundary function corresponds to a first set of operating constraints associated with a baseload operating state of a turbomachinery and the second boundary function corresponds to a second set of operating constraints associated with the baseload operating state of the turbomachinery.

6. The system of claim 5, wherein the first set of operating constraints comprises a set of operating constraints associated with the turbomachinery at or above international organization of standardization (ISO) conditions.

7. The system of claim 5, wherein the second set of operating constraints comprises a set of operating constraints associated with the turbomachinery below international organization of standardization (ISO) conditions.

8. The system of claim 1, comprising the turbomachinery, wherein the turbomachinery comprises a gas turbine.

9. A non-transitory computer-readable medium storing computer executable code comprising instructions to:

derive a first boundary function mapping a first value to a first temperature, wherein the first value is a compressor pressure ratio (CPR) value and the first temperature is an actual firing temperature;

derive a second boundary function mapping a second value to a second temperature, wherein the second value is a compressor inlet temperature (CTIM) value and the second temperature is a delta firing temperature representative of the difference between the actual firing temperature and a derived firing temperature;

receive a signal representative of a gas turbine firing temperature; and convert the signal to an actuator signal to actuate a fuel valve supplying fuel to the gas turbine by following a combination of the first boundary function and the second boundary function.

10. The non-transitory computer-readable medium of claim 9, wherein the first boundary function corresponds to a first set of operating constraints associated with a baseload operating state of a turbomachinery and the second boundary function corresponds to a second set of operating constraints associated with the baseload operating state of a turbomachinery.

11. The non-transitory computer-readable medium of claim 10, wherein the first set of operating constraints comprises a set of operating constraints associated with a turbomachinery at or above international organization of standardization (ISO) conditions.

12. The non-transitory computer-readable medium of claim 10, wherein the second set of operating constraints comprises a set of operating constrains associated with a turbomachinery below international organization of standardization (ISO) conditions.

13. The non-transitory computer-readable medium of claim 9, comprising instructions executing an adjustment function configured to derive an adjustment value based on ambient conditions, wherein the adjustment value is used to adjust the actuator signal.

14. The non-transitory computer readable medium of claim 9, wherein the computer executable code is provided as an update to an existing control process.

15. A method comprising:

deriving a first boundary function mapping a first value to a first temperature, wherein the first value is a compressor pressure ratio (CPR) value and the first temperature is an actual firing temperature;

deriving a second boundary function mapping a second value to a second temperature wherein the second value is a compressor inlet temperature (CTIM) value and the second temperature is a delta firing temperature representative of the difference between the actual firing temperature and a derived firing temperature;

collecting a sensor signal representative of a fired temperature; and converting the sensor signal to a first actuator signal to actuate a fuel valve of a gas turbine system by following a reference function, wherein the reference function comprises a combination of the first boundary function and the second boundary function.

16. The method of claim 15, wherein the first boundary function corresponds to a first set of operating constraints associated with a baseload operating state of a turbomachinery and the second boundary function corresponds to a second set of operating constraints associated with the baseload operating state of a turbomachinery.

17. The method of claim 16, wherein the first set of operating constraints comprises a set of operating constraints associated with the turbomachinery at or above international organization of standardization (ISO) conditions, and wherein the second set of operating constraints comprises a set of operating constraints associated with the turbomachinery below the ISO conditions.

* * * * *